United States Patent [19]

Numata et al.

[11] Patent Number: 5,632,179
[45] Date of Patent: May 27, 1997

[54] METHOD OF MANUFACTURING AN ENGAGING ELEMENT FOR ONE WAY CLUTCH IMPROVING SQUARENESS OF CAM FACE RELATIVE TO SIDE SURFACES

[75] Inventors: Tetsuaki Numata, Kitakatsuragi-gun; Shigeo Maeda, Nara, both of Japan

[73] Assignees: Koyo Seiko Co., Ltd.; Osakaseiko, Limited, both of Osaka, Japan

[21] Appl. No.: 354,076

[22] Filed: Dec. 6, 1994

[30] Foreign Application Priority Data

Dec. 8, 1993  [JP]  Japan ................... 5-307809
Oct. 20, 1994 [JP]  Japan ................... 6-255143

[51] Int. Cl.⁶ .................................................. B21K 1/76
[52] U.S. Cl. ...................................... 72/356; 72/377
[58] Field of Search ......................... 72/338, 339, 356, 72/359, 377

[56] References Cited

U.S. PATENT DOCUMENTS

| | | | |
|---|---|---|---|
| 3,054,177 | 9/1962 | Duhamel | 72/356 |
| 3,124,876 | 3/1964 | Putetti | 72/339 |
| 3,641,801 | 2/1972 | Lachaussee et al. | 72/377 |

FOREIGN PATENT DOCUMENTS

| | | | |
|---|---|---|---|
| 51-110468 | 9/1976 | Japan | 72/359 |
| 1-284451 | 11/1989 | Japan | 72/359 |
| 1814585 | 5/1993 | Russian Federation | 72/356 |

OTHER PUBLICATIONS

Ferris, E. A., "Automotive Sprag Clutches–Current Design and Application", *Design Practices–Passenger Car Automatic Transmissions,* (1988) pp. 6–16.

*Primary Examiner*—Lowell A. Larson
*Attorney, Agent, or Firm*—Wenderoth, Lind & Ponack

[57] ABSTRACT

A method of manufacturing an engaging element for a one way clutch requires no special control with respect to such factors as squareness between a cam face and side surfaces, possible flaws, and cut size, and enables production of the engaging element for a one way clutch at low cost. The method includes shearing a material by a press to prepare a sheared member of a predetermined size, and a forging process. The forgoing process includes a first step of striking one sheared surface of the sheared member, a second step of inverting the sheared member and striking the other sheared surface of the sheared member, a third step of inverting the sheared member and striking the one sheared surface of the sheared member, and a fourth step of inverting the sheared member and striking the other sheared surface of the sheared member.

3 Claims, 7 Drawing Sheets

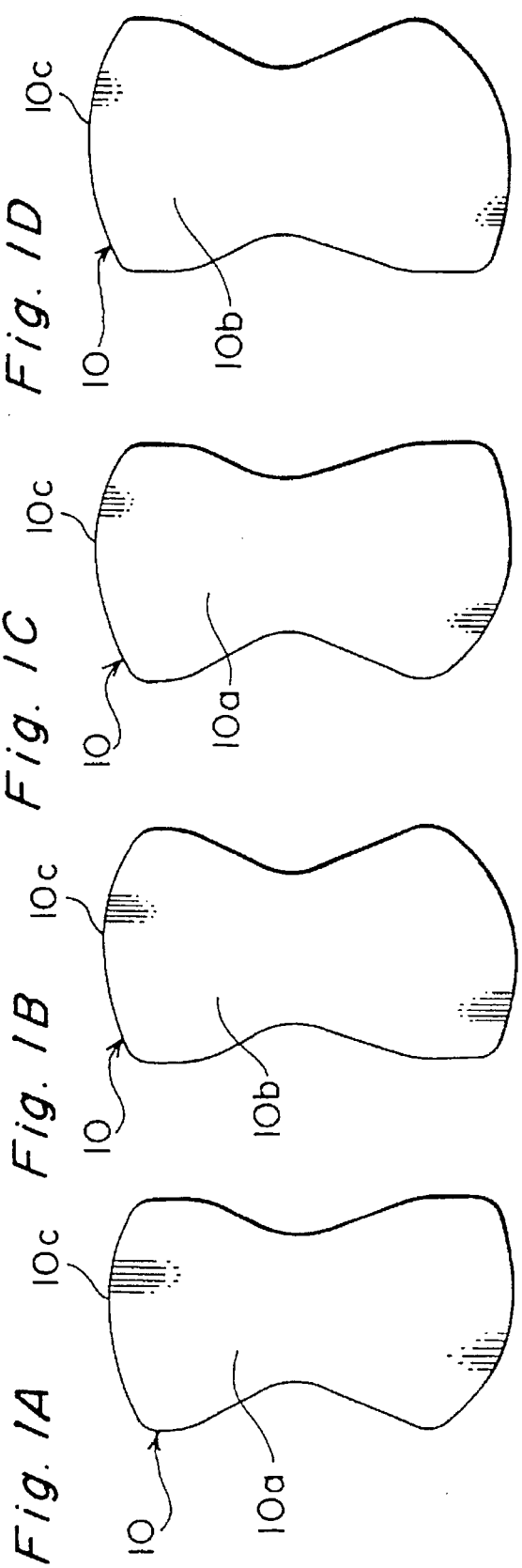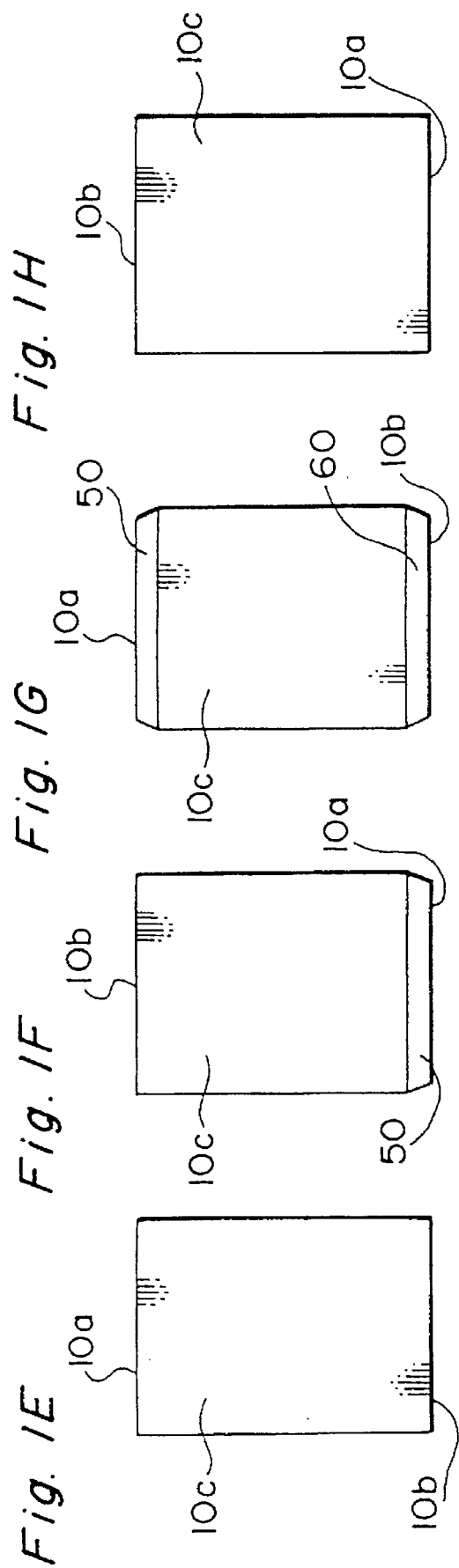

METHOD OF MANUFACTURING AN ENGAGING ELEMENT FOR ONE WAY CLUTCH IMPROVING SQUARENESS OF CAM FACE RELATIVE TO SIDE SURFACES

BACKGROUND OF THE INVENTION

1. Field of the Invention

The present invention relates to a method of manufacturing an engaging element, e.g. a sprag for a one way clutch.

2. Description of the Prior Art

As illustrated in FIG. 7, a one way clutch has a plurality of engaging elements 71, 71, 71 . . . arranged in a circumferential direction, and is operative to engage such engaging element 71 with both inner and outer rings (not shown) thereby to transmit power from the inner ring to the outer ring or from the outer ring to the inner ring. The configuration of such engaging element 71 is illustrated in FIG. 8. The engaging element 71 has a cam face 71a adapted to be brought into engagement with the outer and inner rings.

Hitherto, engaging elements for a one way clutch of this type have been manufactured in the following way. Initially, a material is drawn to be formed into one having a circumferential surface defining a cam face 71a. Then, a continuous length of the material drawn to have such a circumferential surface is cut by a grinder into parts of a predetermined size, each part being formed with cut surfaces 71b. Next, the parts thus drawn and cut are each barrel-finished for being enabled to have a finished surface. Each of the finished parts is heat treated and then barrel-finished once again.

With the above described prior-art manufacturing method, however, one problem is that during the drawing process the circumferential surface of the material, being a cam face 71a, is likely to have some flaw caused thereto, which necessitates a special control practice intended for avoidance of such naturally results in increased cost.

Another problem is that after the drawing process, some special control is required with respect to the cut size for the drawn material to be cut by a grinder and as well as to the squareness of cut surface 71b relative to the cam face 71a as shown in FIG. 8, which also leads to increased cost.

SUMMARY OF THE INVENTION

Therefore, an object of the present invention is to provide a method of manufacturing an engaging element for a one way clutch which requires no special control with respect to such factors as squareness between a cam face and a side surface, possible flaws, and cut size, and which enables the production of the engaging element for a one way clutch at low cost.

In order to accomplish the above object, the present invention provides a method of manufacturing an engaging element for a one way clutch, the engaging element designed to be disposed between an inner ring and an outer ring and having a cam face engageable with the inner and outer rings, the method comprising:

shearing a material by a press to prepare a sheared member of a predetermined size; and cold forging the sheared member, placed in a die, by striking by means of a striking member side surfaces of the sheared member other than a circumferential surface intended to serve as a cam face, thereby forming the side surfaces and the cam face to desired respective shapes.

In the method of manufacturing an engaging element for a one way clutch in accordance with the present invention, after the material is sheared by the press, the resulting sheared member is subjected to cold forging in which the sheared member undergoes striking by a striking member on its side surfaces other than a circumferential surface portion intended to serve as a cam face. Therefore, side surfaces of the sheared member and a cam face adjacent to the side surfaces can be shaped as desired, resulting in improved squareness between the cam face and the adjoining side surfaces. Therefore, as compared to the prior art method in which shearing is made after drawing, the present invention is advantageous in that it provides for improvement in the squareness of the cam face of the engaging member relative to the side surfaces of the engaging member.

The fact that forging is carried out by striking the side surfaces of the sheared member which is to be made into an engaging member permits easy removal of the resulting engaging element from the die. If striking is carried out with respect to a circumferential surface portion of the sheared member, the trouble is that it may not be possible to remove the resulting engaging member from the die, or there may be produced a cam face having a seam or joint.

According to the invention, the cam face of an engaging element can be formed by forging. Unlike the conventional method in which a cam face of an engaging element is formed by drawing, therefore, the present invention prevents any possible flaw being caused to a cam face of an engaging element in the course of fabrication. Further, the invention permits such cam face to be made with high precision.

According to the invention, after the material is sheared by pressing, the resulting sheared member is formed into an engaging element by cold forging, and this permits dimensional adjustments during the process of cold forging. Therefore, no special control is required with respect to cut size during the shearing operation.

In this way, the present invention provides for improvement in the squareness of a cam face of an engaging element relative to side surfaces adjacent thereto, prevents flaws being caused to such cam face during the process of fabrication, permits high precision forming of the cam face, and requires no special control measure with respect to the dimensional aspect of material shearing. According to the invention, therefore, the requirements for precision control can be considerably reduced, which results in good cost reduction.

In the method of the present invention, the process of press shearing is immediately followed by forging. This means that the process of fabrication involves a shorter cycle time than that involved in the conventional method in which a material is first subjected to drawing, followed by grinder cutting. Therefore, the invention provides for good improvement in manufacturing efficiency, thus resulting in cost reduction.

In an embodiment of the present invention, the forging process comprises the steps of:

placing the sheared member in a first die, striking one side surface of the sheared member by the striking member, removing the sheared member from the first die, inverting the sheared member and placing the thus inverted sheared member in a second die, and striking the other side surface of the sheared member by a striking member.

According to this embodiment of the invention, after the side surfaces of the sheared member are inverted, the sheared member is placed in the second die. This means that the different side surfaces of the sheared member are struck in the first and second dies, that is, opposite side surfaces adjacent to a cam face are struck, which results in good improvement in the flatness of the opposite side surfaces, as well as in high precision forming of the cam face adjoined by the opposite side surfaces. Another merit is that working on the two side surfaces is equalized with the result that further improvement can be achieved in the squareness of the two side surfaces relative to the cam face.

The fact that different side surfaces of the sheared member are struck in the first and second dies insures that a corner defined between the one side surface and the cam face and another corner defined between the other side surface and the cam face are both formed into substantially right-angled configurations and do not have insufficient squareness.

It is possible to arrange that, when one side surface of the sheared member is struck in the first die, the other side surface of the sheared member is chamfered edgewise, whereby any burr or fin present on the other side surface can be eliminated. This facilitates removal of the sheared member from the first die. After this removal, the sheared member is inverted and placed in the second die and is struck on its other side surface therein, with the result that the chamfer formed on the other side surface is eliminated.

In another embodiment, the forging process comprises the steps of:

placing the sheared member in a first die, striking one side surface of the sheared member by a striking member, removing the sheared member from the first die, and translating the sheared member for placement in a second die and striking the one side surface of the sheared member by a striking member.

According to this embodiment of the invention, the method do not include an inversion step, and the sheared member is translated from the first die to the second die. This permits easier and speedier movement of the sheared member between the dies, which results in improved productivity. The fact that the sheared member is translated between the first and second dies means that one and the same side surface of the sheared member is struck in both the first and second dies. Therefore, the first and second dies can be analogously configured, and this provides for ease of die fabrication and reduction in the cost of such fabrication.

According to this embodiment, where plural non-inversion steps are provided for higher precision working, movement of the sheared member from one die to another involves only translation and, therefore, a plurality of transfer means for movement of the sheared member can be employed. This results in good saving in the cost of die fabrication for such transfer means.

In another embodiment of the invention, the forging process comprises the steps of:

moving the sheared member between separate dies, inverting the sheared member during such movement, and striking different side surfaces of the sheared member by striking members in the respective dies before and after inversion.

According to this embodiment, during the transfer of the sheared member between separate dies, the sheared member is inverted so that the sheared member is struck on different side surfaces thereof in the two dies between which the inversion takes place. This provides for further enhancement of inherent advantages of the above-described embodiment, including (1) improvement in the flatness of opposite side surfaces, (2) high precision shaping of a cam profile, (3) improvement in the squareness of the two side surfaces relative to a cam face, and (4) production of a corner portion defined between one side surface and a cam face and a corner portion defined between the other side surface and the cam face, both in substantially perfect right-angled configuration and having sufficient squareness.

In another embodiment of the invention, the forging process comprises the steps of:

moving the sheared member between separate dies, translating the sheared member during such movement, and striking one and the same side surface of the sheared member by striking members in the two dies between which the translation is made.

According to this embodiment, during the transfer of the sheared member between separate dies, the sheared member is translated so that the sheared member is struck on one and the same side surface thereof in all the dies involved. This provides the following three advantages: (1) easier and speedier movement of the sheared member between the dies, and increased productivity; (2) use of dies of analogous or identical configuration which is enabled by the fact that only translation is involved in the movement of the sheared member between the dies, which is very convenient from the standpoints of die manufacture and cost economy; and (3) use of plural transfer means in common for transfer of sheared members is made possible because only translation is involved in transfer of the sheared member from one die to another, with some saving in the cost of die manufacture for transfer means.

In another embodiment of the invention, the forging process comprises the steps of:

moving the sheared member between separate dies, inverting the sheared member during such movement, striking different side surfaces of the sheared member by striking members in the two dies between which the inversion is made, moving the sheared member between separate dies while translating the sheared member during such movement, and striking one and the same side surface of the sheared member by striking members in the two dies between which the translation is made.

According to this embodiment, the sheared member is worked in a number of dies, and in this case two modes of transfer are involved, inversion transfer and translational transfer. In the two dies between which the transfer is made in the inversion mode, the sheared member is struck on different side surfaces thereof, while in the two dies between which the transfer is made in the translation mode, the sheared member is struck on one and the same side surface thereof. This provides, in combination, seven advantages. That is, (1) improvement in the flatness of the opposite side surfaces, (2) high precision shaping of the cam profile, (3) improvement in the squareness of the two side surfaces relative to a cam face, and (4) production of a corner portion defined between one side surface and a cam face and a corner portion defined between the other side surface and the cam face, both in substantially perfect right-angled configuration and of sufficient squareness; (5) easier and speedier movement of the sheared member between the dies, and increased productivity; (6) use of dies of analogous or identical configuration for dies between which the translation takes place, which is very convenient from the standpoint of die manufacture; and (7) use of common transfer means for transfer of the sheared member between separate dies, with some saving in the cost of die manufacture for the transfer means.

In another embodiment of the invention, the forging process comprises the steps of:

placing the sheared member in a first die, striking one side surface of the sheared member by a striking member, removing the sheared member from the first die, invertedly placing the sheared member in a second die and striking the other side surface of the sheared member by a striking member, removing the sheared member from the second die, translating the sheared member for placement in a third die, striking the other side surface of the sheared member by a striking member, removing the sheared member from the third die, invertedly placing the sheared member in a fourth die, and striking the one side surface member of the sheared member by a striking member.

According to this embodiment, the method includes an inversion step for inverting the side surfaces of the sheared member during the movement of the sheared member from the first die to the second die, a non-inversion step for translating the sheared member during the movement thereof from the second die to the third die, and another inversion step for inverting the sheared member during the movement thereof from the third die to the fourth die.

The fact that the opposite side surfaces of the sheared member which adjoin a cam face are struck through the inversion step provides the following five advantages: (1) improvement in the flatness of opposite side surfaces; (2) high precision shaping of a cam profile with respect to the cam face sandwiched between the two side surfaces; (3) equalization of work effected with respect to the two side surfaces and improvement in the squareness of the two side surfaces relative to the cam face; (4) production of a corner portion defined between one side surface and the cam face and a corner portion defined between the other side surface and the cam face, both in substantially perfect right-angled configuration and of sufficient squareness; and (5) removal of any burr or fin present on the other side surface of the sheared member by chamfering the other side surface edgewise when the one side surface of the sheared member is struck in the first die, which facilitates the removal of the sheared member from the first die.

According to this embodiment, the sheared member is translated from the second die to the third die. This enables easier and speedier transfer between the dies. In addition, the second and third dies can be rendered substantially identical, which facilitates die fabrication. According to this embodiment, therefore, it is possible to increase the number of forging steps while restraining any increase in the cost of manufacture, thereby to achieve a higher level of precision working.

In another embodiment of the invention, the forging process comprises:

a first step comprising placing the sheared member in a first die and striking one side surface of the sheared member by a striking member;

a second step comprising removing the sheared member from the first die, placing the sheared member in a second die after inverting the same, and striking the other side surface of the sheared member by a striking member;

a third step comprising removing the sheared member from the second die, placing the sheared member in a third die after inverting the same, and striking the one side surface of the sheared member by a striking member; and a fourth step comprising removing the sheared member from the third die, placing the sheared member in a fourth die after inverting the same, and striking the other side surface of the sheared member by a striking member.

According to this embodiment, different side surfaces of the sheared member are subjected to striking in alternate relation in four steps. Therefore, it is possible to achieve good improvement in the flatness of opposite side surfaces in particular and, at the same time, to provide high precision shaping of cam profile with respect to a cam face sandwiched between the two side surfaces. Further, working with respect to the two side surfaces can be equalized, which contributes to further improvement in the squareness of the two side surfaces relative to the cam face.

The fact that the different side surfaces of the sheared member are struck alternately in the four dies enables formation of a substantially perfect right-angled profile, without any appreciable deficiency, with respect to a corner defined between the one side surface and the cam face and a corner defined between the other side surface and the cam face.

In an embodiment of the invention, at least one of the dies is so configured that when the sheared member is placed in the die and struck on one of the side surfaces thereof by the striking member, the other side surface of the sheared member is chamfered edgewise.

According to this embodiment, at least one of the dies is so configured that when the sheared member, placed in the die, is struck on one side surface thereof, the other side surface of the sheared member is chamfered edgewise. In subsequent steps, the sheared member is removed from the die, is inverted or translated for transfer to another die, and is placed therein for being struck on the other or the one side surface thereof.

In the subsequent steps, therefore, any burr or fin present on the other side surface of the sheared member can be removed. This permits easier removal of the sheared member from the die. Later, when the sheared member is struck on the other or the one side surface thereof, the chamfer formed on the other side surface is eliminated.

In an embodiment of the invention, side surfaces of the sheared member are surfaces formed by shearing.

According to this embodiment, the side surfaces of the sheared member are sheared surfaces formed by shearing. Therefore, the cam face is not a sheared surface. This means that the fiber structure which constitutes the cam face is not subjected to shearing. According to this embodiment, therefore, it is possible to provide a tough and smooth cam face.

BRIEF DESCRIPTION OF THE DRAWINGS

The present invention will be more fully understood from the detailed description given hereinbelow and the accompanying drawings which are given by way of illustration only, and thus are not limiting of the present invention, and wherein:

FIGS. 1A, 1B, 1C and 1D are plan views showing shear planes in a first embodiment of the method of manufacturing an engaging element for a one way clutch according to the invention, and FIGS. 1E, 1F, 1G and 1H are side surface views showing cam faces of the engaging element;

DETAILED DESCRIPTION OF THE PREFERRED EMBODIMENTS

Embodiments of the present invention will now be described in detail with reference to the accompanying drawings.

In a first embodiment of the method of manufacturing an engaging element for a one way clutch in accordance with the invention, a sheared member of a predetermined size is first prepared by shearing a material by means of a press. Then, a cold forging process is carried out.

Figure 2:
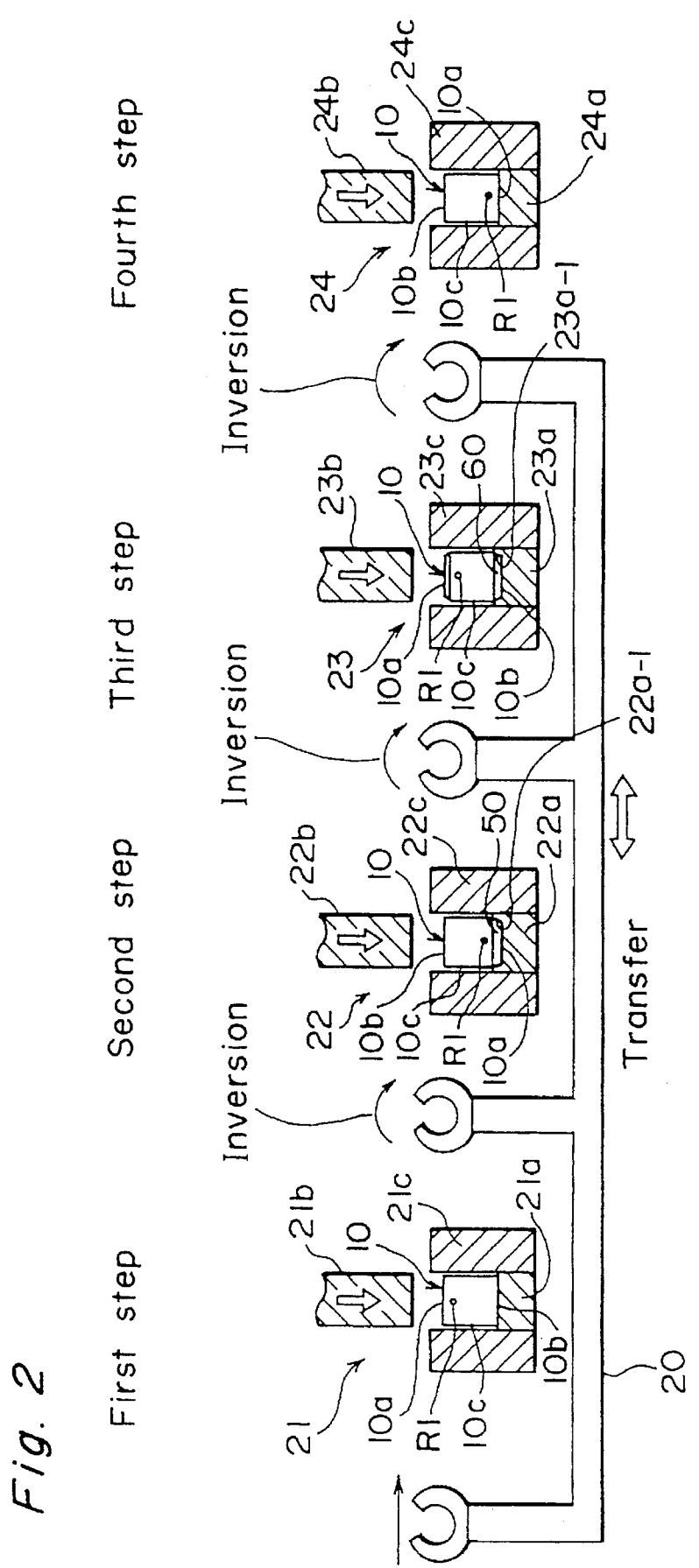
FIG. 2 is a schematic view explaining a cold forging process in the first embodiment.

At a first step of the cold forging process, the sheared member 10 is translated on a transfer device 20 for transfer to a first pressing unit 21. In FIG. 2, a cam face 10c of the sheared member 10 bears a small round mark R1 at a spot adjacent to one sheared surface 10a. This small round mark R1 is a mark for indicating the orientation of the sheared member 10 in FIG. 2, though an actual sheared member 10 bears no such mark. As FIG. 2 shows, the sheared member 10 is placed on a bed 21a, which is set in a frame 21c, of the pressing unit 21 in a position that the one sheared surface 10a faces upward. A slide 21b of the pressing unit 21 which acts as a striking member slides downward to strike the sheared surface 10a of the sheared member 10 with a planar striking surface at a predetermined force. The planar striking surface of striking member 21b is maintained parallel with a planar surface of bed 21a against which is pressed or impacted other surface 10b. By being struck by the slide 21b the sheared surface 10a is shaped flat and, at the same time, sheared surface 10b is pressed flat and a circumferential surface of the sheared member, including a cam face 10c, is pressed against the frame 21c, being thus curved. As a result, the sheared surface 10a is made guitar-shaped. FIG. 1A shows a sheared surface 1a as viewed from above the bed 21a, and FIG. 1E shows a cam face 10c of the sheared member 10 on the bed 21a as viewed from the side.

Then, operation proceeds to a second step in which the sheared member 10 is removed from the first pressing unit 21 and, after being inverted by the transfer device 20, is conveyed to a second pressing unit 22. The sheared member 10 is then placed, with the other sheared surface 10b facing upward, on a bed 22a of the second pressing unit 22, which is then set in a frame 22c. Then, a slide 22b of the pressing unit 22 which acts as a striking member slides downward to strike the other sheared surface 10b of the sheared member 10 with a predetermined force. As a result, the other sheared surface 10b is improved in flatness and, at the same time, the cam face 10c is pressed against the frame 22c for being shaped so that the cam face 10c is made closer to a predetermined cam profile.

Simultaneously, the one sheared surface 10a of the sheared member 10 is pressed against the bed 22a with an edge portion of the one sheared surface 10a pressed against a taper portion 22a-1 provided on the bed 22a. Thus, a chamfer 50 is formed along the edge portion of the one sheared surface 10a. This provides for removal of any burr or fin present at the edge portion of the sheared member 10a, which in turn enables easy removal of the sheared member 10 by the transfer device 20 from the second pressing unit 22. It is noted that the chamfer 50 is shown in an exaggerated size. FIG. 1B shows the sheared surface 10b as viewed from above the bed 22a, and FIG. 1F shows the cam face 10c of the sheared member 10 on the bed 22a as viewed from the side.

Then, operation proceeds to a third step in which the sheared member 10 is removed from the second pressing unit 22 and, after being inverted by the transfer device 20, is conveyed to a third pressing unit 23. The sheared member 10 is then placed on a bed 23a of the third pressing unit 23, with the one sheared surface 10a facing upward. Then, a slide 23b of the pressing unit 23 which acts as a striking member slides downward to strike the one sheared surface 10a of the sheared member 10 with a predetermined force. Thus, the chamfer 50 is removed as a result of striking, and the one sheared surface 10a is improved in flatness. At the same time, the cam face 10c is pressed against the frame 22c for being shaped so that the cam face 10c is made closer to the predetermined cam profile.

Simultaneously, the other sheared surface 10b of the sheared member 10 is pressed against the bed 23a with an edge portion of the other sheared surface 10b pressed against a taper portion 23a-1 provided on the bed 23a. Thus, a chamfer 60 is shown also in an exaggerated size. This provides for removal of any burr or fin present at the edge portion of the sheared member 10b, which in turn enables easy removal of the sheared member 10 by the transfer device 20 from the third pressing unit 22.

FIG. 1C shows the sheared surface 10a as viewed from above the bed 23a, and FIG. 1G shows the cam face 10c of the sheared member 10 on the bed 23a as viewed from the side.

Figure 6:
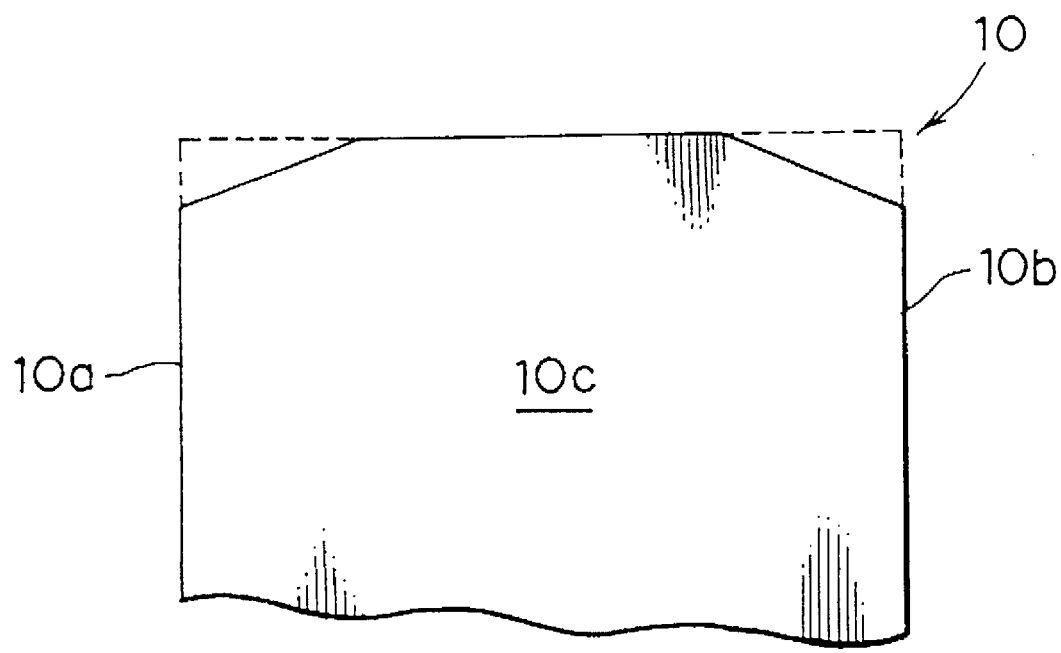
FIG. 6 is a view showing a corner configuration of an engaging element.
Figure 7:
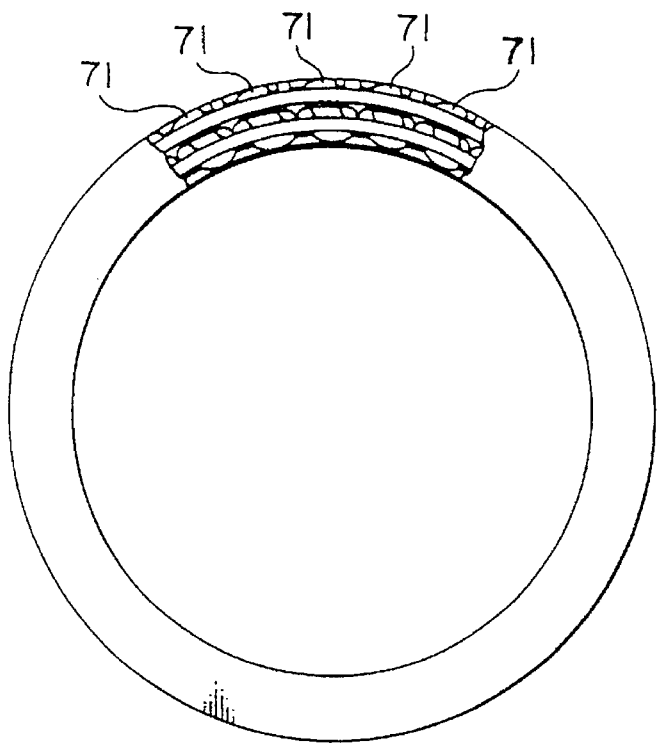
FIG. 7 is a plan view showing a one way clutch.
Figure 8:
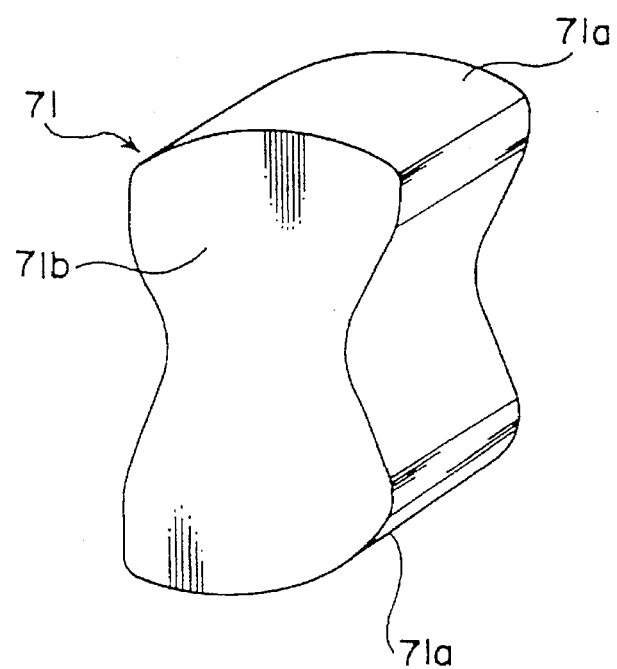
FIG. 8 is a perspective view of an engaging element for the one way clutch.

Then, operation proceeds to a fourth step in which the sheared member 10 is removed from the third pressing unit 23 and, after being inverted by the transfer device 20, is conveyed to a fourth pressing unit 24. The sheared member 10 is then placed on a bed 24a of the fourth pressing unit 24, with the other sheared surface 10b facing upward. Then, a slide 24b of the pressing unit 24 which acts as a striking member slides downward to strike the other sheared surface 10b of the sheared member 10 with a predetermined force. Thus, the chamfer 60 is removed as a result of striking, and the other sheared surface 10b is improved in flatness. At the same time, the one sheared surface 10a of the sheared member 10 is pressed against the bed 24a. This enables the edge of the sheared surface 10a to be formed into a rectangular, substantially right-angled configuration, as shown by broken lines in FIG. 6, from a corner-slanted configuration as shown by solid lines in FIG. 6. In other words, the edge of the sheared member 10 can be made into a rectangularly-edged, right-angled configuration suitable for an engaging element.

At the same time, the cam face 10c is pressed against the frame 24c for being shaped to the predetermined cam profile.

Figure 5:
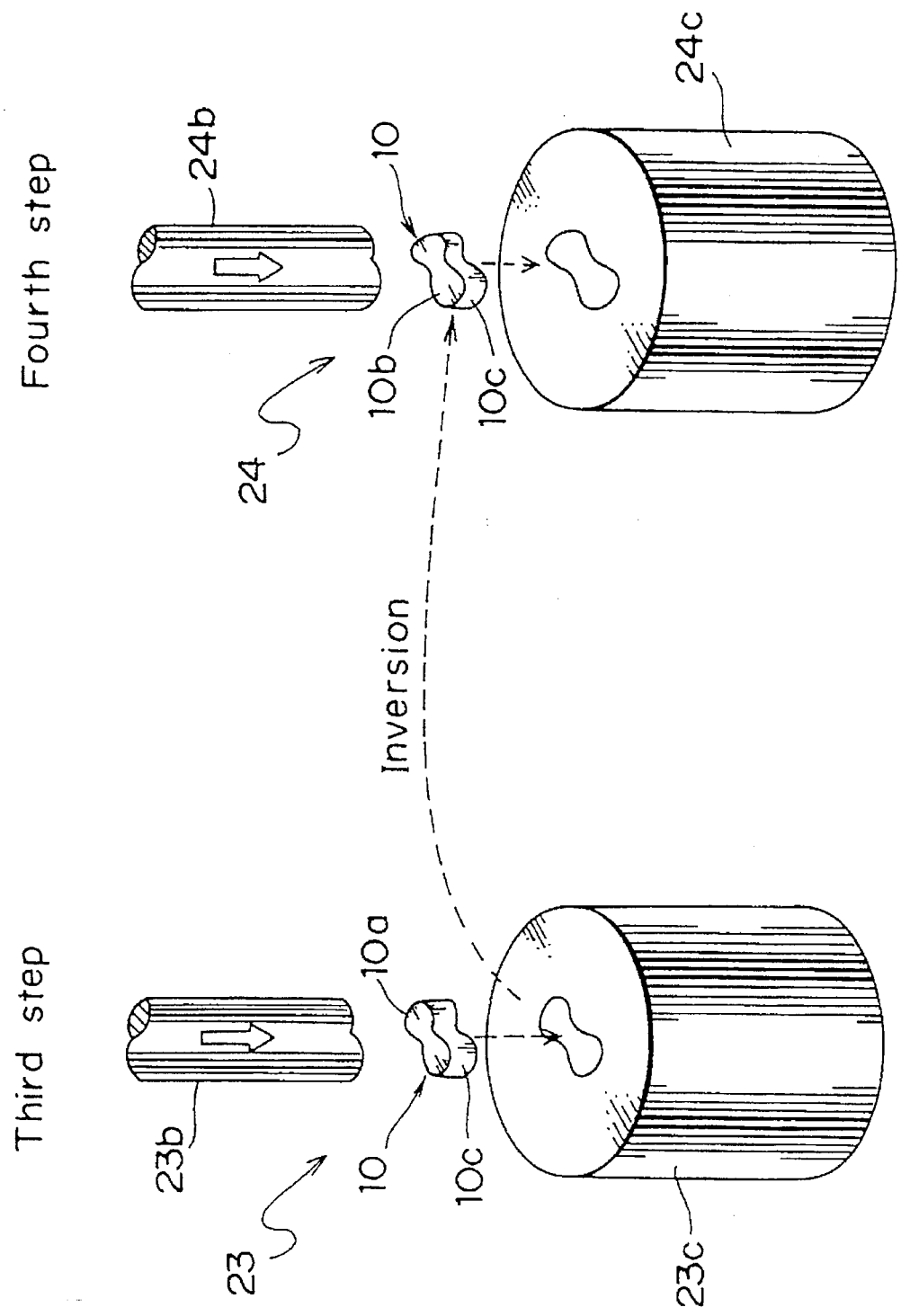
FIG. 5 is a perspective view showing a third pressing unit and a fourth pressing unit in the first embodiment.

FIG. 5 shows principal parts of the third pressing unit 23 and the fourth pressing unit 24, and also some aspects of the sheared member 10 as viewed obliquely from the front side surface thereof. FIG. 1D shows the sheared surface 10b as viewed from above the bed 24a, and FIG. 1H shows the cam face 10c of the sheared member 10 as viewed from the side.

Subsequently, the sheared member 10 which has been worked into shape is barrel-finished for surface finishing. Then, after passing through a heat treatment, it is barrel-finished once again. Through the foregoing process is manufactured an engaging element for a one way clutch.

According to the above described first embodiment, after the material is sheared by a press, the resulting sheared member 10 is subjected to the process of cold forging in which sheared surfaces 10a, 10b of the sheared member 10 are worked by striking. As compared to the conventional method in which cutting follows drawing, the embodiment is advantageous in that it provides for good improvement in the squareness of the cam face 10c of the engaging element relative to the sheared surfaces 10a, 10b of the engaging element.

Forging is carried out by striking the sheared surfaces 10a, 10b which are not to be used as cam faces, and not striking the cam face 10c of the sheared member 10. This permits easy removal of the sheared member 10 from respective frames 21c–24c of pressing units 21–24. If the cam face 10c of the sheared member 10 is struck, the sheared material 10 may not be removed from the frame or there may be formed a seam or joint on the cam face.

According to the first embodiment, a surface other than the sheared surfaces formed by material shearing is used as the cam face 10c and, therefore, the fiber construction which constitutes the cam face 10c is not cut, remains unaffected by shearing and presents a smooth and tough surface.

According to the first embodiment, the sheared surfaces 10a, 10b of the sheared member 10 are forged by striking so that the circumferential surface of the sheared member 10 is pressed against the frames 21c, 22c, 23c of the pressing units 21, 22, 23. In this way, the cam face 10c is worked stepwise in four steps for being properly shaped as such. Therefore, the cam face 10c can be worked in high precision to the predetermined cam profile. Further, unlike the conventional method in which a cam face of an engaging element is formed by drawing, the above described first embodiment involves no possibility of flaws being caused on the cam face of an engaging element while being shaped as such.

According to the first embodiment, after a material is sheared by a press, the process of forging is carried out by striking the sheared surfaces 10a, 10b of sheared member 10. This enables any dimensional adjustment to be made during the forging process. Therefore, unlike the conventional method, the first embodiment does not require any special control with respect to cutting size of the sheared member 10.

In this way, according to the first embodiment, it is possible to improve the squareness of the cam face 10c of the engaging element relative to the sheared surfaces 10a, 10b, and also to achieve high precise shaping of cam face 10. Furthermore, the cam face 10c of engaging element 10 is unlikely to incur any flaws during the process of shaping, and special control with respect to cut size of the sheared member is not required. Therefore, according to the first embodiment, control requirements with respect to precision can be substantially reduced, which in effect results in cost reduction with respect to the produced engaging elements.

The first embodiment, in which forging is carried out after press shearing, involves relatively short cycle time as compared with the conventional method in which grinder cutting is carried out after the process of drawing. Therefore, the first embodiment provides for good improvement over the conventional method in the manufacturing efficiency of the engaging elements, which in effect results in reduced fabrication cost.

According to the first embodiment, different sheared surfaces 10a, 10b are alternately struck in four steps and, therefore, it is possible to improve the flatness of both the sheared surfaces 10a and 10b. Further, since the two sheared surfaces 10a, 10b can be equally worked, the sheared member 10 can be worked into an accurate configuration which presents plane symmetry relative to a plane extending between the sheared surfaces 10a and 10b and which is free of distortion.

According to the first embodiment, chamfers 50, 60 are formed on edges of the sheared surfaces 10a, 10b of the sheared member 10 in the second and third steps of the forging process. This makes it possible to prevent any burr or fin from being formed on the sheared surfaces 10a, 10b during forging operations in the second and third steps. Therefore, removal of the sheared member 10 from each of the second and third pressing units can be made easier.

In the first embodiment, the sheared member 10 is worked by forging. This makes it possible to improve the strength of the engaging elements through work-hardening. Since the forging operations are conducted with the sheared member 10 being caused to be inverted step after step, it is possible to prevent any structural offsetting.

Figure 3:
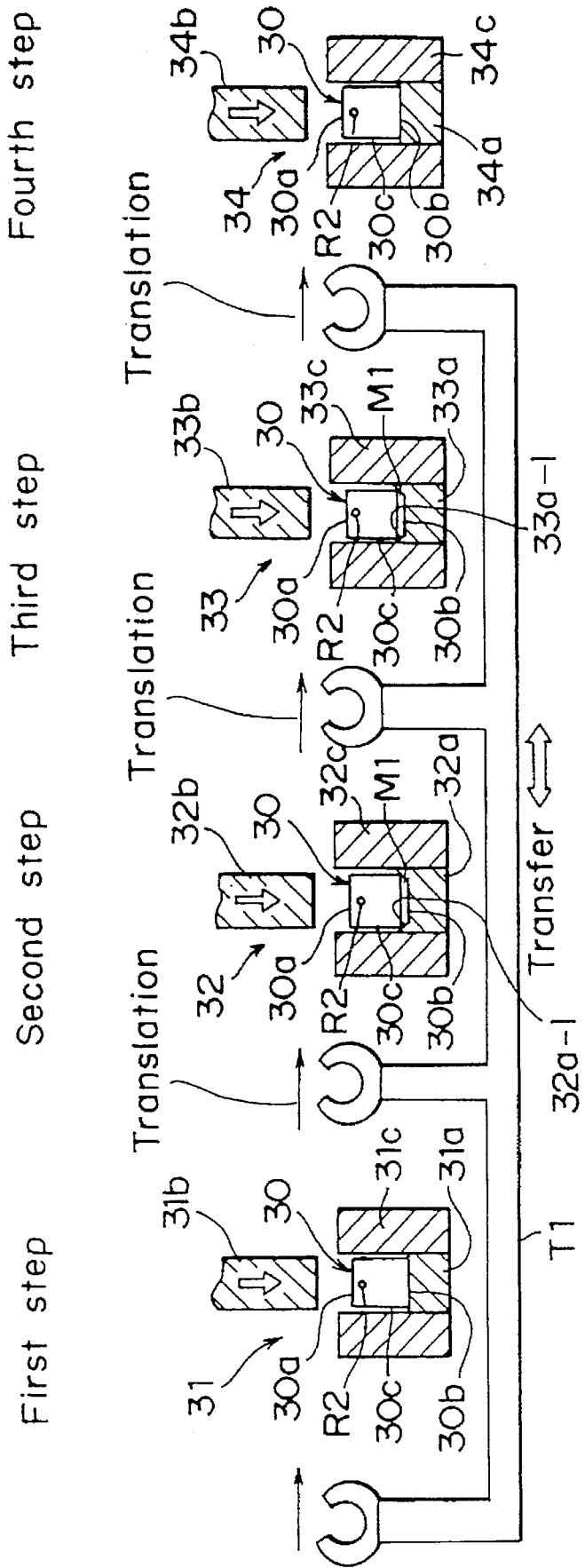
FIG. 3 is a schematic view explaining a cold forging process in a second embodiment.

FIG. 3 illustrates a second embodiment of the invention. In this second embodiment, a sheared member of a predetermined size is first prepared by shearing a material by means of a press. Then, a cold forging process is carried out.

At a first step of the cold forging process shown in FIG. 3, a sheared member 30 is translated by a transfer device T1 for transfer to a first pressing unit 31. In FIG. 3, a cam face 30c of the sheared member 30 bears a small round mark R2 at a spot adjacent to one sheared surface 30a. This small round mark R2 is a mark for indicating the orientation of the sheared member 30 in FIG. 3, though actual sheared member 30 bears no such mark. As FIG. 3 shows, the sheared member 30 is placed, with the one sheared surface 30a facing upward, on a bed 31a, which is set in a frame 31c, of the pressing unit 31. A slide 31b of the pressing unit 31 which acts as a striking member slides downward to strike the one sheared surface 30a of the sheared member 30 with a predetermined force. By being struck by the slide 31b the sheared surface 30a is shaped flat and, at the same time, a circumferential surface of the sheared member, including a cam face 30c, is pressed against the frame 31c, being thus curved. As a result, the sheared surface 30a is made guitar-shaped.

Then, operation proceeds to a second step in which the sheared member 30 is removed from the first pressing unit 31 and is translated by the transfer device T1 for transfer to a second pressing unit 32. The sheared member 30 is then placed, with the one sheared surface 30a facing upward, on a bed 32a, which is set in a frame 32c, of the second pressing unit 32. Then, a slide 32b of the pressing unit 32 which acts as a striking member slides downward to strike the one sheared surface 30a with a predetermined force. As a result, the one sheared surface 30a is improved in flatness and, at the same time, the cam face 30c is pressed against the frame 32c for being shaped so that the cam face 30c is made closer to a predetermined cam profile.

Simultaneously, the other sheared surface 30b of the sheared member 30 is pressed against the bed 32a with an edge portion of the other sheared surface 30b pressed against a taper portion 32a-1 provided on the bed 32a. Thus, a chamfer M1 is formed along the edge portion of the other sheared surface 30b. This provides for removal of any burr or fin present at the edge portion of the sheared member 30b, which in turn enables easy removal of the sheared member 30 by the transfer device T1 from the second pressing unit 32.

Then, operation proceeds to a third step in which the sheared member 30 is removed from the second pressing unit 32 and is translated by the transfer device T1 for transfer to a third pressing unit 33. The sheared member 30 is then placed on a bed 33a, which is then set in frame 33c, of the third pressing unit 33 with the one sheared surface 30a facing upward. In this case, since the sheared surface 30b has a chamfer M1 formed on its edge, the edge of the sheared surface 30b can be prevented from catching the frame 33c and the sheared member 30 can be received smoothly into the frame 33c. Then, a slide 33b of the pressing unit 33 which acts as a striking member slides downward to strike the one sheared surface 30a of the sheared member 30 with a predetermined force. Thus, the one sheared surface 30a of the sheared member 30 is improved in flatness. At the same time, the cam face 30c is pressed against the frame 32c for being shaped so that the cam face 30c is made closer to the predetermined cam profile. In this case, the chamfer M1 formed at the edge of the other sheared surface 30b of the sheared member 30 is pressed against a taper portion 33a-1 provided on the bed 33a and thus retains a tapered configuration. Therefore, the edge of the sheared surface 30b is not liable to incur any burr or fin, which permits easy removal of the sheared member 30 from the third pressing unit 33.

Then, operation proceeds to a fourth step in which the sheared member 30 is removed from the third pressing unit 33 and is translated by the transfer device T1 for transfer to a fourth pressing unit 34. The sheared member 30 is then placed on a bed 34a, which is set in the frame 34c, of the fourth pressing unit 34, with the one sheared surface 30a facing upward. In this case, the chamfer M1 formed at the edge of the sheared surface 30b prevents the edge of the sheared surface 30b from catching the frame 34c, so that the sheared member 30 can be received smoothly into the frame 34c. Then, a slide 34b of the pressing unit 34 which acts as a striking member slides downward to strike the one sheared surface 30a of the sheared member 30 with a predetermined force. This results in improved flatness of the one sheared surface 30a. At the same time, the other sheared surface 30b of the sheared member 30 is pressed against the bed 34a. This enables the edge of the sheared surface 30b to be formed into a rectangular, substantially right-angled configuration from a corner-slanted configuration. In other words, the edge of the sheared member 30 can be made into a rectangularly edged and right-angled configuration that is a desired feature of an engaging element.

At the same time, the cam face 30c is pressed against the frame 34c for being shaped to the predetermined cam profile. Also, the chamfer M1 formed at the edge of the other sheared surface 30b is pressed against the bed 34a to be rendered flat and, in effect, is eliminated.

Subsequently, the sheared member 30 which has been worked into shape in the forging process is barrel-finished for surface finishing. Then, after passing through a heat treatment, it is barrel-finished once again. Through the foregoing is manufactured an engaging element for a one way clutch.

According to the above described second embodiment, after the material is sheared by a press, the resulting sheared member 30 is subjected to the process of cold forging in which sheared surface 30a of the sheared member 30 is worked by striking. As compared to the conventional method in which cutting follows drawing, the second embodiment is advantageous in that it provides for good improvement in the squareness of the cam face 30c of the engaging element relative to the sheared surface 30a of the engaging element.

Forging is carried out by striking the sheared surfaces 30a, 30b which are not to be used as cam faces, and not striking the cam face 30c of the sheared member 30. This permits easy removal of the sheared member 30 from respective frames 31c-34c of pressing units 31-34. If the cam face 30c of the sheared member 30 is struck, the sheared member 30 may not be removed from the frame or there may be formed a seam or joint on the cam face.

According to the second embodiment, a surface other than the sheared surfaces formed by material shearing is used as the cam face 30c and, therefore, the fiber structure which constitutes the cam face 30c remains unaffected by shearing and presents a smooth and tough surface.

According to the second embodiment, the sheared surface 30a of the sheared member 30 is forged by striking so that the circumferential surface of the sheared member 30 is pressed against the frees 31c, 32c, 33c, 34c of the pressing units 31, 32, 33, 34. In this way, the cam face 30c is worked stepwise in four steps for being properly shaped as such. Therefore, the cam face 30c can be worked in high precision to the predetermined cam profile. Further, unlike the conventional method in which a cam face of an engaging element is formed by drawing, the second embodiment involves no possibility of flaws being caused on the cam face of an engaging element while being shaped as such.

According to the second embodiment, after a material is sheared by a press, the process of forging is carried out by striking the sheared surface 30a of sheared member 30. This enables any dimensional adjustment to be made during the forging process. Unlike the conventional method, therefore, the second embodiment does not require any special control with respect to cutting size of the sheared member 30.

In this way, according to the second embodiment, it is possible to improve the squareness of the cam face 30c of the engaging element relative to the sheared surface 30a, and also to achieve high precision shaping of cam face 30c. Furthermore, the cam face 30c of engaging element 30 is unlikely to incur any flaws during the process of shaping, and special control with respect to cut size of the engaging element is not required. Therefore, according to the second embodiment, control requirements with respect to precision can be substantially reduced, which in effect results in cost reduction with respect to the produced engaging elements.

The second embodiment, in which forging is carried out after press shearing, involves relatively short cycle time as compared with the conventional method in which grinder cutting is carried out after the process of drawing. Therefore, the second embodiment provides for good improvement over the conventional method in manufacturing efficiency of the engaging elements, which in effect results in reduced fabrication cost.

According to the second embodiment, the sheared member 30 is translated for movement between separate pressing units. This enables high speed and easy transport of sheared members 30 between separate pressing units (dies), which results in improvement of productivity. Further, the fact that one and same sheared surface 30 of the sheared member 30 is struck in each pressing unit permits use of dies of pressing units of analogous or identical configuration, which facilitates die fabrication and enables cost reduction.

According to the second embodiment, movement of the sheared member 30 between separate pressing units involves translation only. Therefore, the construction of the transfer device T1 is more simple than the transfer device used in the first embodiment. This permits cost reduction in the manufacture of transfer device fabrication.

According to the second embodiment, a chamfer M1 is formed at an edge portion of the sheared surface 30b of the sheared member 30 in the second and third forging steps. Therefore, the sheared surface 30b can be protected from difficulties due to burrs. This permits easy removal of the sheared member 30 from the second and third pressing units 32, 33.

In the second embodiment, the sheared member is worked by forging. This insures effective work hardening and production of an engaging element having improved strength.

Figure 4:
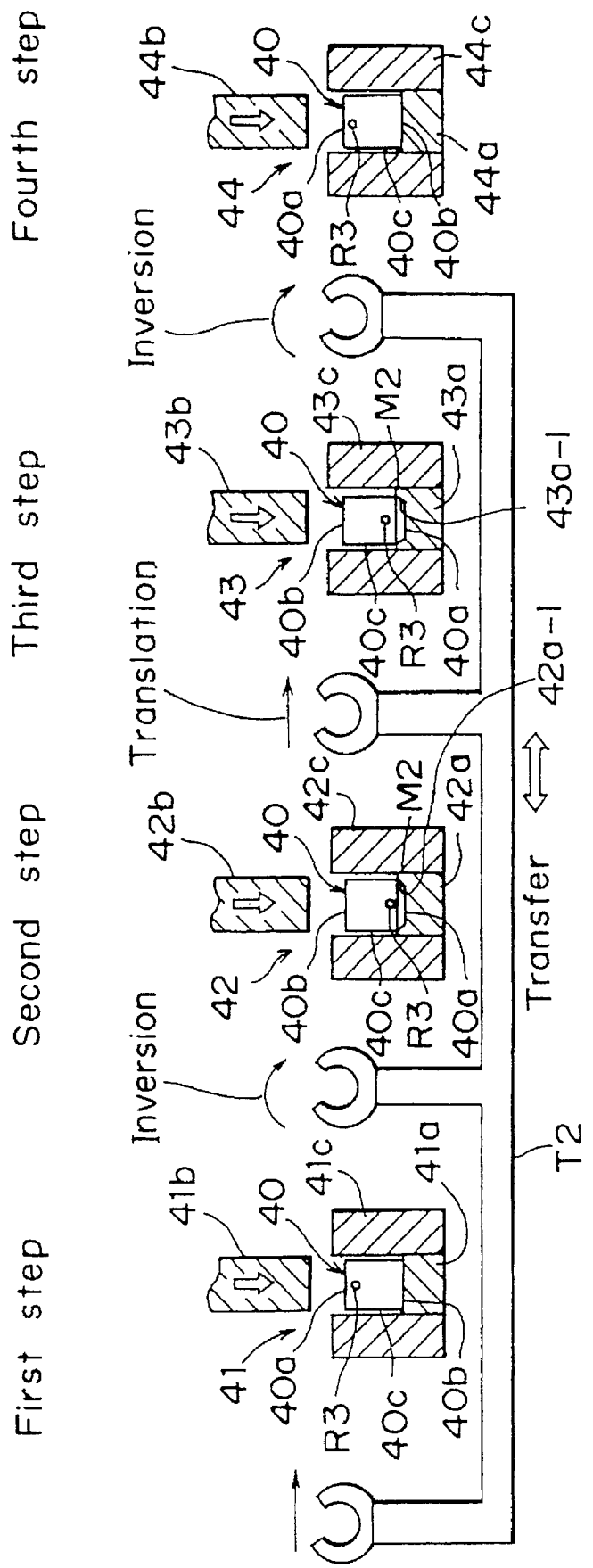
FIG. 4 is a schematic view explaining a cold forging process in a third embodiment.

FIG. 4 illustrates a third embodiment of the invention. In this third embodiment, a sheared member of a predetermined size is first prepared by shearing a material by means of a press. Then, a cold forging process is carried out, as shown in FIG. 4.

At a first step of this cold forging process, the sheared member 40 is translated by a transfer device T2 for transfer to a first pressing unit 41. In FIG. 4, a cam face 40c of the sheared member 40 bears a small round mark R3 at a spot adjacent to one sheared surface 40a. This small round mark R3 is a mark for indicating the orientation of the sheared member 40 in FIG. 4, though actual sheared member 40 bears no such mark. As FIG. 4 shows, the sheared member 40 is placed on a bed 41a, which is set in a frame 41c, of the pressing unit 41 with the one sheared surface 40a of the sheared member 40 facing upward. A slide 41b of the pressing unit 41 which acts as a striking member slides downward to strike the one sheared surface 40a of the sheared member 40 with a predetermined force. By being struck by the slide 41b the sheared surface 40a is shaped flat and, at the same time, a circumferential surface of the sheared member, including a cam face 40c, is pressed against the frame 41c, being thus curved. As a result, the sheared member 40 is made guitar-shaped.

Then, operation proceeds to a second step in which the sheared member 40 is removed from the first pressing unit 41 and is inverted by the transfer device T2 for transfer to a second pressing unit 42. The sheared member 40 is then placed on a bed 42a, which is set in a frame 42c, of the second pressing unit 42 with the other sheared surface 40b facing upward. Then, a slide 42b of the pressing unit 42 which acts as a striking member slides downward to strike the other sheared surface 40b with a predetermined force. As a result, the other sheared surface 40b is improved in flatness and, at the same time, the cam face 40c is pressed against the frame 42c for being shaped so that the cam face 40c is made closer to a predetermined cam profile.

Simultaneously, the one sheared surface 40a of the sheared member 40 is pressed against the bed 42a with an edge portion of the one sheared surface 40a pressed against a taper portion 42a-1 provided on the bed 42a. Thus, a chamfer M2 is formed along the edge portion of the one sheared surface 40a. This provides for removal of any burr or fin present at the edge portion of the sheared surface 40a, which in turn enables easy removal of the sheared member 40 by the transfer device T2 from the second pressing unit 42.

Then, operation proceeds to a third step in which the sheared member 40 is removed from the second pressing unit 42 and is translated by the transfer device T2 for transfer to a third pressing unit 43. The sheared member 40 is then placed on a bed 43a of the third pressing unit 43, with the other sheared surface 40b facing upward. Then, a slide 43b of the third pressing unit 43 which acts as a striking member slides downward to strike the other sheared surface 40b of the sheared member 40 with a predetermined force. Thus, the other sheared surface 40b of the sheared member 40 is improved in flatness. At the same time, the cam face 40c is pressed against the frame 42c for being shaped so that the cam face 40c is made closer to the predetermined cam profile. At the same time, the one sheared surface 40a of the sheared member 40 is pressed against the bed 43a with an edge portion of the one sheared surface 40a pressed against a taper portion 43a-1 provided on the bed 43a. The chamfer M2 formed at the edge portion of the one sheared surface 40a is retained as such. Therefore, the edge of the sheared surface 40a is not liable to have any burrs or fins, which permits easy removal of the sheared member 40 by the transfer device T2 from the third pressing unit 43.

Then, operation proceeds to a fourth step in which the sheared member 40 is removed from the third pressing unit 33 and is inverted by the transfer device T2 for transfer to a fourth pressing unit 44. The sheared member 40 is then placed on a bed 44a of the fourth pressing unit 44, with the one sheared surface 40a facing upward. Then, a slide 44b of the pressing unit 44 which acts as a striking member slides downward to strike the one sheared surface 40a of the sheared member 40 with a predetermined force. As a result, the chamfer M2 is eliminated and the flatness of the one sheared surface 40a is thus improved. The other sheared surface 40b of the sheared member 40 is pressed against the bed 44a. Thus, the edge portion of the sheared surface 40b, which has a corner-slanted configuration, may be shaped to a rectangular, substantially right-angled configuration. In other words, the edge of the sheared member 40 can be made into a rectangularly-edged and right-angled configuration that is a feature desired of an engaging element. At the same time, the cam face 40c is pressed against the frame 44c for being shaped to the predetermined cam profile.

Subsequently, the sheared member 40 which has been worked into shape in the forging process is barrel-finished for surface finishing. Then, after passing through a heat treatment, it is barrel-finished once again. Through the foregoing process is manufactured an engaging element for a one way clutch.

According to the above described third embodiment, after the material is sheared by a press, the resulting sheared member 40 is subjected to the process of cold forging in which sheared surfaces 40a, 40b of the sheared member 40 are worked by striking. As compared to the conventional method in which cutting follows drawing, the third embodiment is advantageous in that it provides for good improvement in the squareness of the cam face 40c of the engaging element relative to the sheared surfaces 40a, 40b of the engaging element.

According to the third embodiment, a surface other than the sheared surfaces formed by material shearing is used as cam face 40c and, therefore, the cam face 40c the remains unaffected by shearing and presents a smooth and tough surface.

According to the third embodiment, sheared surfaces 40a, 40b of the sheared member 40 are forged by striking so that the circumferential surface of the sheared member 40 is pressed against the frames 41c, 42c, 43c, 44c of the pressing units 41, 42, 43, 44. In this way, the cam face 40c can is worked stepwise in four steps for being properly shaped as such. Therefore, the cam face 40c can be worked in high precision to the predetermined profile. Further, unlike the conventional method in which a cam face of an engaging element is formed by drawing, the third embodiment involves no possibility of flaws being caused in the cam face of an engaging element while being shaped as such.

According to the third embodiment, after a material is sheared by a press, the process of forging is carried out by striking the sheared surfaces 40a, 40b of sheared member 40. This enables any dimensional adjustment to be made during the forging process. Unlike the conventional method, therefore, the third embodiment does not require any special control with respect to cutting size of the sheared member 40.

In this way, according to the third embodiment, it is possible to improve the squareness of the cam face 40c of engaging element relative to the sheared surfaces 40a, 44b, and also to achieve high precision shaping of cam face 40c. Furthermore, the cam face 40c of engaging element is unlikely to incur any flaws during the process of shaping, and special control with respect to cut size of the engaging element is not required. Therefore, according to the third embodiment, control requirements with respect to precision can be substantially reduced, which in effect results in cost reduction with respect to the produced engaging elements.

The third embodiment, in which forging is carried out after press shearing, involves relatively short cycle time as compared with the conventional method in which grinder cutting is carried out after the process of drawing. Therefore, the third embodiment provides for good improvement over the conventional method in the manufacturing efficiency for engaging elements, which in effect results in reduced fabrication cost.

According to the third embodiment, different sheared surfaces 40a, 40b are struck in the first and second steps respectively, and different sheared surfaces 44b, 40a are struck in the third and fourth steps respectively. Thus, both sheared surfaces 40a, 40b may be improved in flatness. Further, the two sheared surfaces 40a, 40b can be substantially equally worked. Therefore, the sheared surfaces 40a, 40b can be worked to a configuration which presents plane symmetry with respect to a plane extending through a center between the sheared surfaces 40a and 40b and which is free of distortion.

According to the third embodiment the chamfer M2 is formed on the edge of the sheared surface 40a of the sheared member 40 in the second and third forging steps. Therefore, it is possible to prevent occurrence of difficulties of burrs with respect to the sheared surface 40a during forging operations in the first and second steps. This enables easy removal of sheared member 40 from the second and third pressing units 42, 43.

In the third embodiment, the sheared member 40 is worked by forging. This means that the strength of an engaging element can be improved through work hardening. Further, the sheared member 40 is inverted in connection with the forging operation. This prevents structural offsetting with respect the sheared member 40.

In the third embodiment, for movement of the sheared member 40 from the second pressing unit 42 to the third pressing unit 43, the sheared member 42 is translated. This permits high speed and easy transfer of the sheared member 40 from the second pressing unit 42 to the third pressing unit 43. Further, the die at the second pressing unit 42 and the die at the third pressing unit 43 may Be made to be of a substantially similar configuration. This may facilitate the fabrication of dies. According to the third embodiment, therefore, it is possible to increase the number of forging steps while restraining any possible increase in the cost of fabrication, in order to achieve high precision operation.

In the foregoing first, second, and third embodiments, the cold forging process comprises four steps, however, it may comprise more than four steps or less than four steps. It is also to be noted that although chamfering is carried out at the second and third steps in the first, second and third embodiments, chamfering may be carried out in at least one of the first, second and third steps, or chamfering may be omitted.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method of manufacturing an engaging element for a one way clutch, said engaging element being designed to be disposed between an inner ring and an outer ring and having a cam face engageable with the inner and outer rings, said method comprising:

forming a sheared member of a predetermined size by shearing a material by a press; and cold forging said sheared member by a forging process including placing said sheared member in a die and striking by means of a striking member side surfaces of said sheared member other than a circumferential surface thereof intended to serve as a cam face, with a surface of said striking member which strikes one side surface of said sheared member being planar and maintained parallel with a planar surface of said die against which is pressed an opposite other side surface of said sheared member, thereby forming said side surfaces to extend parallel to each other and forming said side surfaces and said cam face to respective desired shapes, said forging process comprising the steps of:

placing said sheared member in a first die;

striking said one side surface of said sheared member by said striking member;

removing said sheared member from said first die;

inverting said sheared member and placing said thus inverted sheared member in a second die;

striking said other side surface of said sheared member by another striking member;

at least one said die being so configured that when said sheared member is placed therein and struck on the respective said side surface thereof by the respective said striking member, the opposite said side surface of said sheared member is chamfered edgewise; and removing said sheared member from said second die, inverting or translating said sheared member for placement in a third die, and striking said other or said one side surface of said sheared member by another striking member.

2. A method of manufacturing an engaging element for a one way clutch, said engaging element being designed to be disposed between an inner ring and an outer ring and having a cam face engageable with the inner and outer rings, said method comprising:

forming a sheared member of a predetermined size by shearing a material by a press; and cold forging said sheared member by a forging process including placing said sheared member in a die and striking by means of a striking member side surfaces of said sheared member other than a circumferential surface thereof intended to serve as a cam face, with a surface of said striking member which strikes one side surface of said sheared member being planar and maintained parallel with a planar surface of said die against which is pressed an opposite other side surface of said sheared member, thereby forming said side surfaces to extend parallel to each other and forming said side surfaces and said cam face to respective desired shapes, said forging process comprising the steps of:

placing said sheared member in a first die;

striking said one side surface of said sheared member by said striking member;

removing said sheared member from said first die;

inverting said sheared member and placing said thus inverted sheared member in a second die;

striking said other side surface of said sheared member by another striking member;

removing said sheared member from said second die;

translating said sheared member and placing the thus translated said sheared member in a third die;

striking said other side surface of said sheared member by another striking member;

removing said sheared member from said third die;

inverting said sheared member and placing said thus inverted sheared member in a fourth die; and striking said one side surface of said sheared member by another striking member.

3. A method of manufacturing an engaging element for a one way clutch, said engaging element being designed to be disposed between an inner ring and an outer ring and having a cam face engageable with the inner and outer rings, said method comprising:

forming a sheared member of a predetermined size by shearing a material by a press; and cold forging said sheared member by a forging process including placing said sheared member in a die and striking by means of a striking member side surfaces of said sheared member other than a circumferential surface thereof intended to serve as a cam face, with a surface of said striking member which strikes one side surface of said sheared member being planar and maintained parallel with a planar surface of said die against which is pressed an opposite other side surface of said sheared member, thereby forming said side surfaces to extend parallel to each other and forming said side surfaces and said cam face to respective desired shapes, said forging process comprising:

a first step comprising placing said sheared member in a first die and striking said one side surface of said sheared member by said striking member;

a second step comprising removing said sheared member from said first die, placing said sheared member in a second die after inverting said sheared member, and striking said other side surface of said sheared member by another striking member;

a third step comprising removing said sheared member from said second die, placing said sheared member in a third die after inverting said sheared member, and striking said one side surface of said sheared member by another striking member; and a fourth step comprising removing said sheared member from said third die, placing said sheared member in a fourth die after inverting said sheared member, and striking other side surface of said sheared member by another striking member.

* * * * *